(12) United States Patent
Christensen et al.

(10) Patent No.: US 11,853,233 B2
(45) Date of Patent: Dec. 26, 2023

(54) SEQUENTIALLY AND BIDIRECTIONALLY CONNECTING PERIPHERALS AND DEVICES TO AN INFORMATION HANDLING SYSTEM

(71) Applicant: Dell Products L.P., Round Rock, TX (US)

(72) Inventors: Steven Michael Christensen, Austin, TX (US); Yimin Xiao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 17/495,882

(22) Filed: Oct. 7, 2021

(65) Prior Publication Data

US 2023/0116300 A1 Apr. 13, 2023

(51) Int. Cl.
G06F 13/10 (2006.01)
G06F 13/42 (2006.01)
G06F 13/40 (2006.01)

(52) U.S. Cl.
CPC ........ *G06F 13/102* (2013.01); *G06F 13/4068* (2013.01); *G06F 13/4282* (2013.01); *G06F 2213/0042* (2013.01)

(58) Field of Classification Search
CPC ............... G06F 13/102; G06F 13/4068; G06F 13/4282; G06F 2213/0042
See application file for complete search history.

(56) References Cited

U.S. PATENT DOCUMENTS

| | | | | |
|---|---|---|---|---|
| 8,086,878 B2 * | 12/2011 | Diab | ...................... | H04L 12/10 713/320 |
| 2012/0281537 A1 * | 11/2012 | Radke | ...................... | H04L 47/27 370/235 |
| 2015/0349467 A1 * | 12/2015 | Yang | .................. | H01R 13/6582 439/607.55 |
| 2017/0286328 A1 * | 10/2017 | Grosse-Puppendahl | | ...................... G06F 13/4286 |
| 2018/0308564 A1 * | 10/2018 | Ross | ...................... | G06F 13/102 |
| 2020/0096325 A1 * | 3/2020 | Yuan | ...................... | G01B 11/22 |
| 2021/0132657 A1 * | 5/2021 | Chan | ...................... | G06F 1/1632 |
| 2021/0263600 A1 * | 8/2021 | Starrett | ............... | G06F 3/04845 |

* cited by examiner

*Primary Examiner* — Idriss N Alrobaye
*Assistant Examiner* — Ronald T Modo
(74) *Attorney, Agent, or Firm* — TERRILE, CANNATTI & CHAMBERS, LLP; Emmanuel A. Rivera

(57) ABSTRACT

Described are an information handling system, peripheral devices, and methods to connect the information handling or host to the peripheral devices. Physical connections connect the host with the one or more peripheral devices and the peripheral devices with one another. Electrical and communication connections connect the host with the one or more peripheral devices and the peripheral devices with one another. Power and power management are provided by the host through the electrical connection. An input from the host to the peripheral devices is used to establish communication flow between the host and the peripheral devices.

15 Claims, 8 Drawing Sheets

SEQUENTIALLY AND BIDIRECTIONALLY CONNECTING PERIPHERALS AND DEVICES TO AN INFORMATION HANDLING SYSTEM

BACKGROUND OF THE INVENTION

Field of the Invention

The present invention relates to information handling systems. More specifically, embodiments of the invention provide for sequentially and bidirectionally connecting peripherals and devices to information handling systems.

Description of the Related Art

As the value and use of information continues to increase, individuals and businesses seek additional ways to process and store information. One option available to users is information handling systems. Information handling systems include personal computers (PC), such as desktops, notebooks, or laptops. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as PCs, can be connected to or include a keyboard. For example, a desktop PC may be connected to a separate keyboard. Laptops and notebooks can have an integrated keyboard. In certain instances, it is desirable for a keyboard, whether separate from or integrated as part of a PC to be connected to a peripheral device, such as a 10-key pad, touch pad, input device, etc.

Connection with the keyboard and peripheral device may be through a wired connection or wireless connection, such as Bluetooth. Wireless connection may require a separate dongle on the PC which may require a dedicated port on the PC.

Implementations using a wired connection can result in cable clutter. Wireless connection can require cabled power. The peripheral device may require and consume batteries or use a separate power source. When external keyboards are implemented, user preference as to placement of the peripheral device may be limited. For example, placement may be limited to right handed users and may not accommodate for left handed users.

SUMMARY OF THE INVENTION

An information handling system configured to connect and communicate with one or more peripheral devices, comprising physical connections to connect with the one or more peripheral devices; electrical and communication connections to connect with the one or more peripheral devices; providing power and power management through the electrical connection; and providing an input through the communication connection to the one or more peripheral devices, wherein the input is used by the one or more peripheral devices to establish communication flow between the host and the one or more peripheral devices.

A peripheral device configured to connect and communicate with a host and other peripheral devices, comprising physical connections to connect with the host and the other peripheral devices; electrical and communication connections to connect with the one or more peripheral devices; receiving power and power management through the electrical connection; and receiving an input through the communication connection, wherein the input is used to establish communication flow between the host and the other peripheral devices.

A method of connecting a host to one more peripheral devices comprising providing physical and magnetic connections between the host and the one or more peripheral devices; providing electrical and communication connections between the host and the one or more peripheral devices; sending an input from the host to the one or more peripheral devices; and establishing communication flow between the host and the one or more peripheral devices based on the input.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
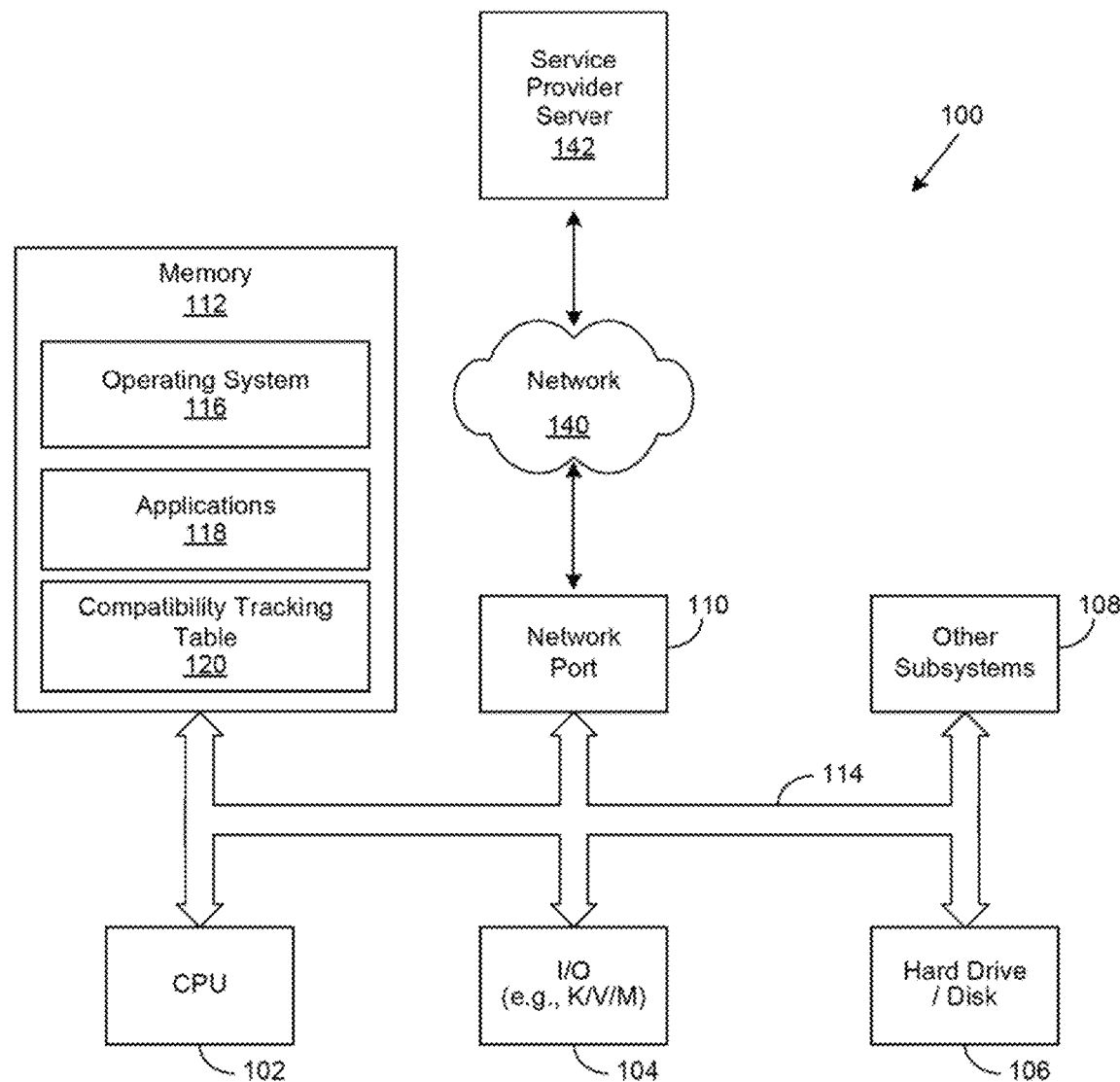
FIG. 1 is a general illustration of components of an information handling system as implemented in the present invention.

Various implementations provide for a host to connect with one or more peripheral devices. Example of peripheral devices include 10 key pads, music mixer, video editor, photo editor, gaming keypad, TV remote, point of sale device, fingerprint reader, programmable multi-function device, etc. The host can include a notebook or laptop personal computer (PC), a keyboard connected to a desktop PC, a PC integrated into a keyboard, etc. Implementations provide for a peripheral device to be connected on either side (left/right) of the host. Peripheral devices can have connections on either side (left/right), and include circuitry to detect an input side, where switching is performed such that, the other side becomes an output. Implementations may also provide for top/bottom connections (e.g., other sides).

Embodiments, provide for a USB connection; however, other connections can be used, such as PCIe. In embodiments using USB connection, a USB hub switching circuit can be used to determine input and output sides of the connected peripheral device. When reversing left or right connection to the host, the peripheral device can automatically reverse functions and connection as to input and output sides. By realizing which side (left/right) a peripheral device is to the host, peripheral behavior can change depending on location of the peripheral device to the host, such as touchpad switch functions. Implementations can also provide for peripherals to be connected to one another in a daisy chain.

Certain embodiments provide for a quick disconnect connection with the host and peripheral devices, such as with a male/female pogo pin connectors, traditional style mechanical connectors, androgynous connectors, etc. Embodiments can also provide for external tab and slot physical connectors between host and peripheral devices, and between peripheral devices. Although left and right sides are described herein, it is to be understood that our directions (sides) can be implemented, such as the bottom/top of a host or peripheral. Implementations provide for the use of I2C protocol for peripheral identification, as well as providing control and power management.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

FIG. 1 is a generalized illustration of an information handling system 100 that can be used to implement the system and method of the present invention. The information handing system 100 can be a host to the peripheral devices described herein. As discussed, the information handling system can include a notebook or laptop personal computer (PC) or a PC integrated into a keyboard.

The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, I/O devices 104 include the peripheral devices described herein, which are connected to the information handling system 100, where the information handling system 100 is a host. In certain implementations, an I/O device 104 can be a keyboard which acts as the host to the peripheral devices.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Implementations provide for the system memory 112 to include applications 118. In various embodiments, the system memory 112 can include a compatibility tracking table 120 that provides information as to devices that connect to the information handling system 100.

Figure 2A:
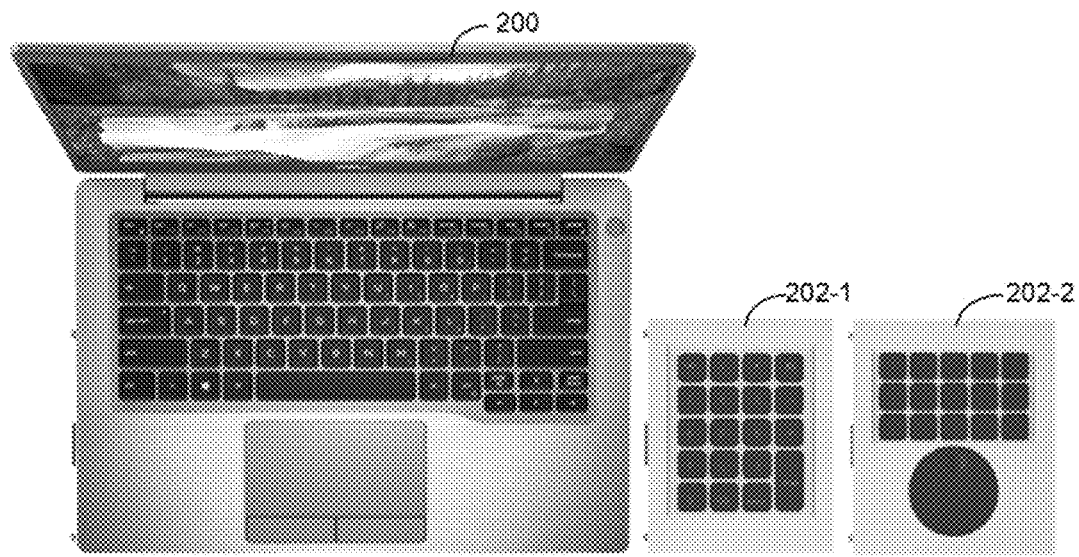
FIG. 2A illustrates a configuration of a notebook personal computer (PC) and connected peripheral devices as implemented in the present invention.

FIG. 2A shows an example implementation of a laptop or notebook personal computer (PC) host or PC 200 and connected peripheral devices 202-1 and 202-2. As discussed, the PC 200 is implemented as an information handling system 100 described in FIG. 1. Although an information handling system is shown as the host 200, implementations provide for the host 200 to be keyboard connected to an information handling system or a keyboard implemented as an information handling system.

The peripheral devices 202 can be include various input/output (I/O) devices 104. Examples of peripheral devices 202 include 10 key pads, music mixer, video editor, photo editor, gaming keypad, TV remote, point of sale device, fingerprint reader, programmable multi-function device, etc.

In the configuration shown in FIG. 2A, peripheral device 202-1 is connected to the host 200 on the ride side of the host 200. The peripheral device 202-2 is connected to right side of the peripheral device 202-1. Implementations provide for other peripheral devices 202 to be added and daisy chained to the peripheral device 202-2.

Figure 2B:
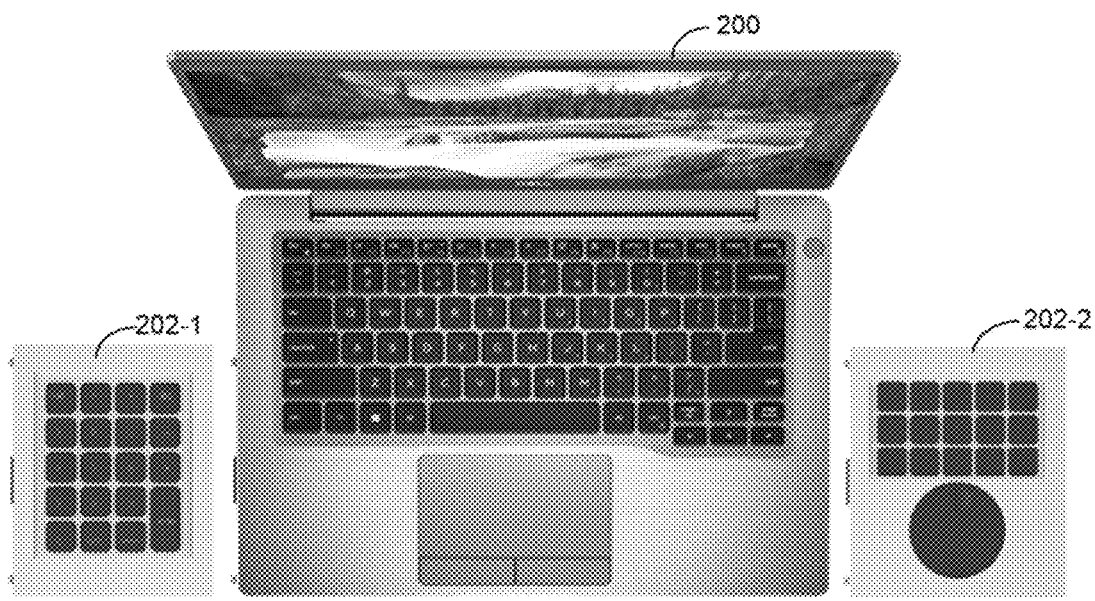
FIG. 2B illustrates another configuration of a notebook personal computer (PC) and connected peripheral devices as implemented in the present invention.

FIG. 2B shows an example implementation of peripheral device 202-1 connected to the left side of the host 200 and the peripheral device 202-2 connected on the right side of the host 200. Other configurations can provide for peripheral devices to be connected exclusively on the left side of host 200 with one or more peripheral devices 202 connected and daisy chained to one another. Configurations further provide for peripheral devices to be connected on both sides of host 200 as shown in FIG. 2B and one or more peripheral devices 202 connected and daisy chain to one another.

Figure 3A:
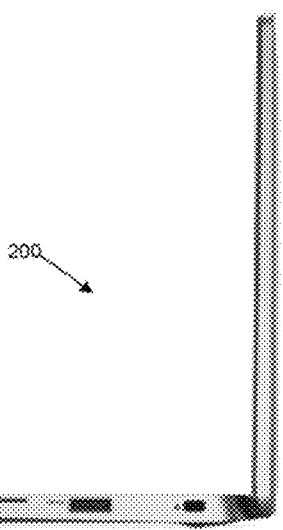
FIG. 3A illustrates external connections of a host notebook or laptop personal computer (PC) to a peripheral device as implemented in the present invention.

FIG. 3A shows example external connections of host 200 to peripheral device(s) 202. FIG. 3A shows a right side view of laptop or notebook personal computer (PC) or host 200. As discussed, embodiments can provide for the host to be a connected keyboard, a PC integrated into a keyboard, etc. The host 200 includes an external interface connector 300. Embodiments provide for interface connector 300 to have pogo pin receptacle connections configure to accept pogo pin connections of peripheral devices 202. In such embodiments, one side of the host 200 has a plug connector, and the opposite side has a receptacle connector. In a similar fashion, one side of the peripheral 202 has a plug connector and the opposite side has a receptacle connector. The interface connector with pogo pins is configured to accept the mating connector of peripheral devices 202.

Implementations provide for host 200 to include tabs/slots 302-1 and 302-2 on either side of interface connector 300. Tabs/slots 302 are inserted into a slot, if configured as a tab, or accept a tab if configured as slot. The complimentary slot is provided at the peripheral devices 202. Furthermore, if the right side of host 200 is configured with tabs 302, the left side of host 200 is configured with slots 302. The use of tabs and slots provides mechanical support and alignment between host 200 and peripheral devices 202.

Implementations further can include magnets 304-1 and 304-2 to be integrated into host 200. The magnets 304-1 and 304-2 are placed inside the exterior covers of host 200, and are on either side of interface connector 300. The magnets 304 are aligned with magnets of opposite polarity that are provided at the peripheral devices 202.

Figure 3B:
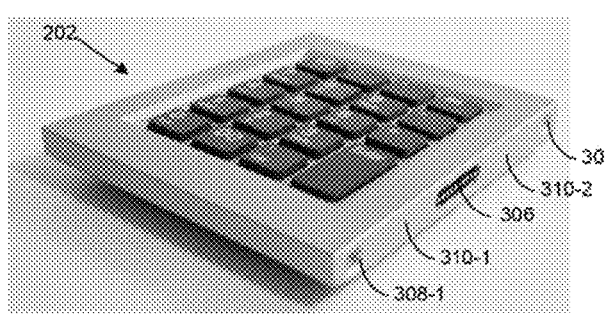
FIG. 3B illustrates external connections of one side of a peripheral device to a host notebook or laptop personal computer (PC) or another peripheral device as implemented in the present invention.

FIG. 3B shows example external connections of one side of a peripheral device 202 to host 200 or another peripheral device 202. FIG. 3B shows a front right side view of peripheral device 202. Implementations provide for the peripheral device 202 to include an external interface connector 306. Embodiments provide for interface connector 306 to have a pogo pin receptacle interface to the host 200 or other peripheral devices 202. In such implementations, when connecting to the host 200 shown in FIG. 3A, the peripheral device would be connected on the left side of the host 200, where an interface connector is configured with the mating pogo pin connection.

The peripheral device 202 further can be implemented with tabs/slots 308-1 and 308-1 on either side of the interface connector 306 to be either inserted into a complimentary slot or accept complimentary tabs on the host 200 or other peripheral devices 202. Implementations can also provide for magnets 310-1 and 310-2 to be integrated into peripheral device 202. The magnets 310-1 and 310-2 are placed inside the exterior covers of peripheral device 202 and are on either side of interface connector 306. The magnets 310 are aligned with magnets of opposite polarity that are provided at the host 200 or other peripheral devices 202.

Figure 3C:
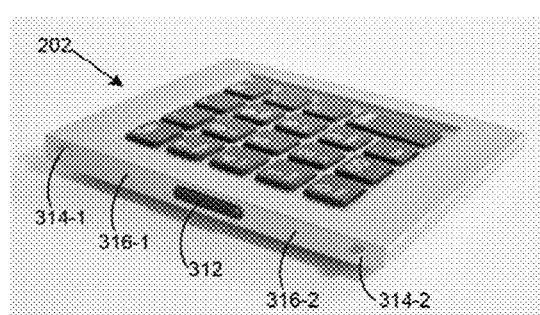
FIG. 3C illustrates external connections of another side of a peripheral device to a host notebook or laptop personal computer (PC) or another peripheral device as implemented in the present invention.

FIG. 3C shows example external connections of another side of peripheral device 202 to host 200 or another peripheral device 202. FIG. 3C shows a front left side view of peripheral device 202. Implementations provide for the peripheral device 202 to include an external interface connector 312. Embodiments provide for interface connector 312 to have pogo pin connections configured to mate to pogo pin receptacle connections of the host 200 or other peripheral devices 202. In such implementations, when connecting to the host 200 shown in FIG. 3A, the peripheral device 200 would be connected on the right side of the host 200, where an interface connector (i.e., interface connector 300) is configured with pogo pin receptacle connections on the host.

The peripheral device 202 further can be implemented with tabs/slots 314-1 and 314-1 on either side of the interface connector 312 to be either inserted into a complimentary slot or accept complimentary tabs on the host 200 or other peripheral devices 202. Implementations can also provide for magnets 316-1 and 316-2 to be integrated into peripheral device 202. The magnets 316-1 and 316-2 are placed inside the exterior covers of peripheral device 202 and are on either side of interface connector 312. The magnets 316 are aligned with magnets of opposite polarity that are provided at the host 200 or other peripheral devices 202.

Figure 4A:
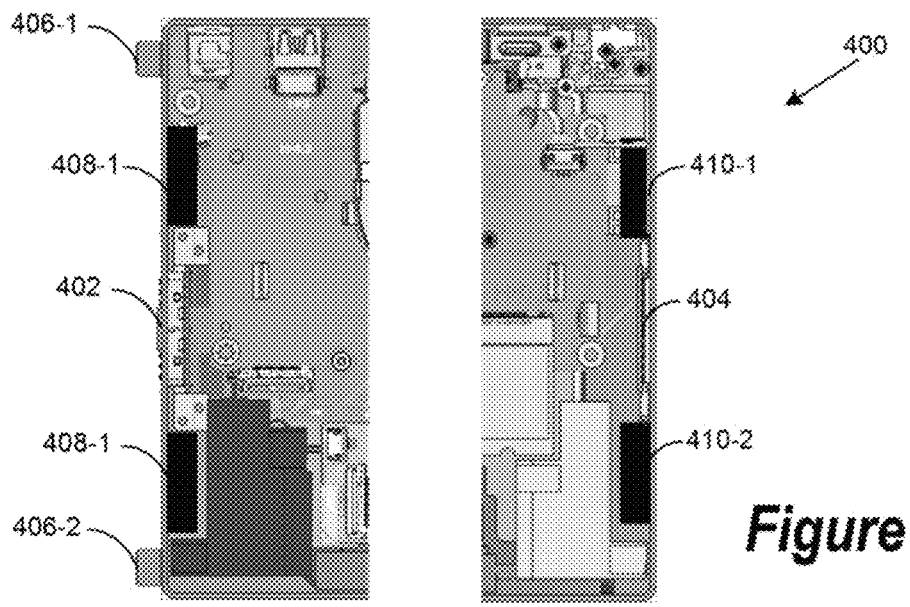
FIG. 4A illustrates electrical, physical, and magnetic connections of a circuit board of a host as implemented in the present invention.

FIG. 4A shows example electrical, physical, and magnetic connections of host 200. In particular, implementations provide for a circuit board 400 that is part of the host 200. The circuit board 400 can include interface connector 402 which can be implemented with pogo pin connections, such as interface connector 300 described in FIG. 3A. Implementations provide for an interface connector 404 on the other side of the circuit board 400. The interface connector 404 in this example can be implemented with pogo pin receptacle connections. As discussed, interface connectors 402 and 404 are used to connect with peripheral devices 202.

Various embodiments provide for tabs and slots on host 200 as described above. Tabs 406-1 and 406-2 of circuit board 400 are examples of tabs that can be fitted into corresponding slots of peripheral devices 202 to provide mechanical alignment and support. The host 200 can be implemented with slots on the other side. The slots may be part of an exterior chassis of host 200 and are not shown in FIG. 4A. Such slots are configured to accept tabs of peripheral devices 202. The use of tabs and slots can assist in aligning the host 200 and peripheral devices 202, and peripherals devices 202 that are connected to one another. In addition, twisting can be prevented with the use of tabs and slots. Implementations can further provide latches for additional retention.

Embodiments can further include magnets 408-1 and 408-2 on one side of the circuit board 400 and magnets 410-1 and 410-2 on the other side of the circuit board. The magnets 408 and 410 are used to connect with magnets of peripheral devices 202 to provide additional secure connection between the host 200 and the peripheral devices 202.

Figure 4B:
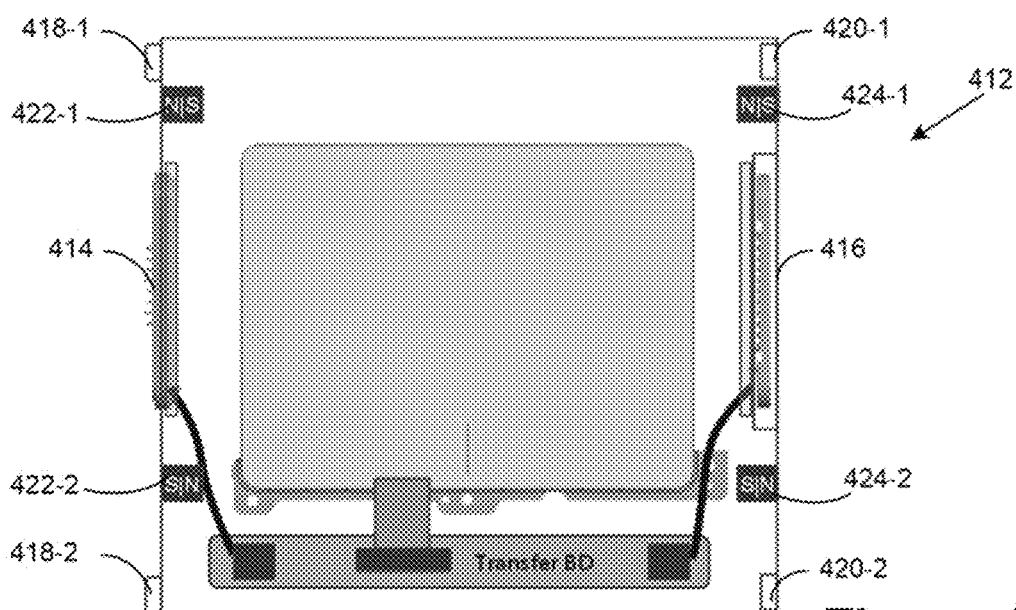
FIG. 4B illustrates electrical, physical, and magnetic connections of a peripheral device as implemented in the present invention.

FIG. 4B shows example electrical, physical, and magnetic connections of peripheral device 202. In particular, implementations provide for a chassis 412 that is part of peripheral device 202. The chassis can support an interface connector 414 which can be implemented with pogo pin connections, such as interface connector 312 described in FIG. 3C. Implementations provide for an interface connector 416 on the other side of the chassis 412. The interface connector 416 in this example can be implemented with pogo pin receptacle connections, such as interface connector 306 described in FIG. 3B. As discussed, interface connectors 414 and 416 are used to connect with host 200 and/or peripheral devices 202.

Various embodiments provide for tabs and slots on peripheral device 202 as described above. Tabs 418-1 and 418-2 of chassis 412 are examples of tabs that can be fitted into corresponding slots of host 202 or other peripheral devices 202 to provide mechanical alignment and support. Implementations provide for the peripheral device 202, and particularly chassis 412 to have slots 420-1 and 420-2 the other side. Slots 420 are configured to accept tabs of host 200 or peripheral devices 202. As discussed, the use of tabs and slots can assist in aligning the peripheral device 202 to host 200, or aligning peripheral devices 202 with one another. In addition, twisting can be prevented with the use of tabs and slots. Implementations can further provide of latches to provide additional retention.

Embodiments can further include magnets 422-1 and 422-2 on one side of the chassis 412 and magnets 424-1 and 424-2 on the other side of the chassis 412. The magnets 422 and 424 are used to connect with magnets of opposite polarity of host 200 and other peripheral devices 202 to provide additional secure connection between the peripheral device 202 with host 200 or between peripheral devices 202 with one another.

Figure 4C:
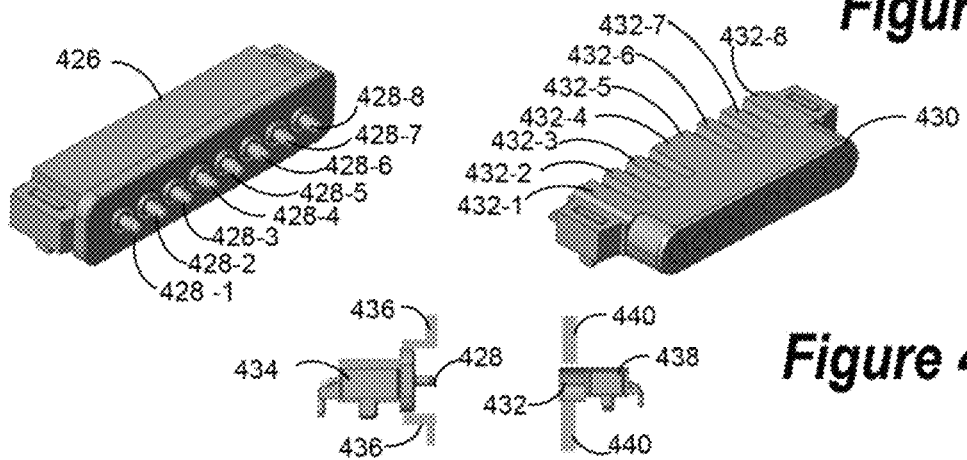
FIG. 4C illustrates pogo pin connections of host and peripheral devices as implemented in the present invention.

FIG. 4C shows example pogo pin connections or interface connectors that can be implemented on host 202 and peripheral devices 202. In various embodiments, the interface connector 426 is an implementation of interface connectors 300, 312, 402, and 414 as described above. Interface connector 426 includes pogo pins 428-1 to 428-8. In various embodiments, the interface connector 430 is an implementation of interface connectors 306, 404, and 416 as described above. Interface connector 430 is implemented with pogo pin receptacles 432-1 to 432-8. In various implementations, the pogo pins 428 are inserted against, or into respective pogo pin receptacles 432.

Implementations can provide for individual pogo pin connectors 434 with a pogo pin 428. The exposed pogo pin 428 can be recessed in a covering 436 to provide for protection. Implementations can provide for individual pogo pin receptacle connectors 438 with a pogo pin receptacle 432. A covering 440 may be provide for the pogo pin receptacle 432.

Figure 5A:
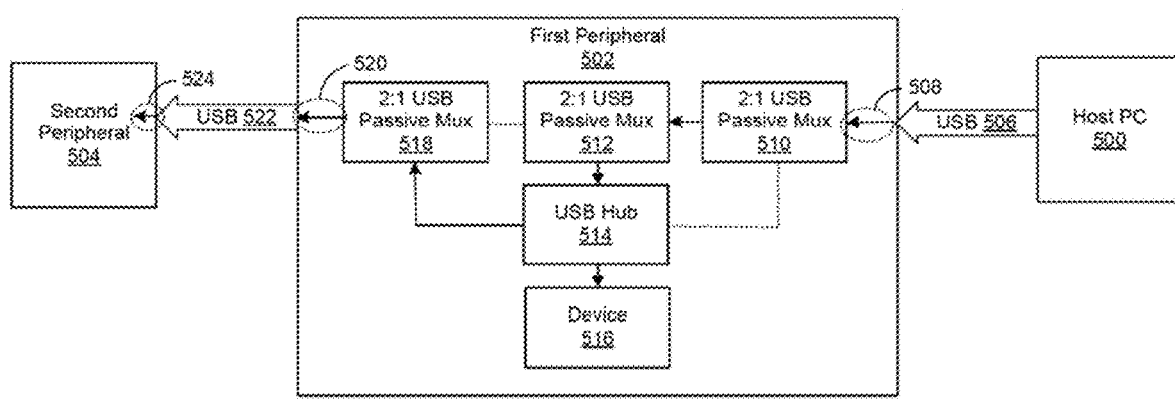
FIG. 5A illustrates a USB hub communication using 2:1 USB passive multiplexors of a peripheral device with a host and another peripheral device with input and output going from right to left of the peripheral device implemented in the present invention.

FIG. 5A shows example USB hub communication using 2:1 USB passive multiplexors of a peripheral device with a host PC and another peripheral device with input and output going from right to left of the peripheral device.

In various embodiments, a host PC 500 communicates with and is connected to a first peripheral device 502. The first peripheral device 502 further communicates with and is connected to a second peripheral device 504. Peripheral devices 502 and 504 are examples of peripheral devices 202 described herein.

Although USB communication is described, other embodiments can make use of other communications, such as PCIe (Peripheral Component Interconnect Express), etc. Various implementations provide for a USB connection 506 from host PC 500 to the first peripheral 502. Directional input 508 is received from the host PC 500. A 2 input 1 output (2:1) passive multiplexor or 2:1 USB passive mux 510 receives the input 508 and automatic switching is performed to receive the directional input 508. In other words, communication is from right to left as shown in FIG. 5A.

Furthermore, realizing which side (left/right) the peripheral device 502 is to the host 500, peripheral behavior can change depending on location of the peripheral device 502 to the host 500, such as touchpad switch functions.

The 2:1 USB passive mux 510 passes communication to another 2:1 USB passive mux 512. Communication continues to a USB hub 514. The USB Hub 514 controls communication flow in the first peripheral device 502. In particular, communication is forwarded to a device 516. Device 516 performs functions of various devices as described herein such as 10 key pads, music mixer, video editor, photo editor, gaming keypad, TV remote, point of sale device, fingerprint reader, programmable multi-function device, etc.

The USB hub 514 further directs communication to another 2:1 USB passive mux 518. Output 520 is provided on USB connection 522 from the first peripheral device 502 to the second peripheral device 504. An input 524 is received by the second peripheral device 504. The second peripheral device 504 can be configured as the first peripheral device 502 to continue communication to a successive peripheral device (e.g., peripheral devices 202).

Furthermore, as described above, realizing which side (left/right) peripheral devices are to the host 500, peripheral behavior can change depending on location of the peripheral devices to the host 500.

Figure 5B:
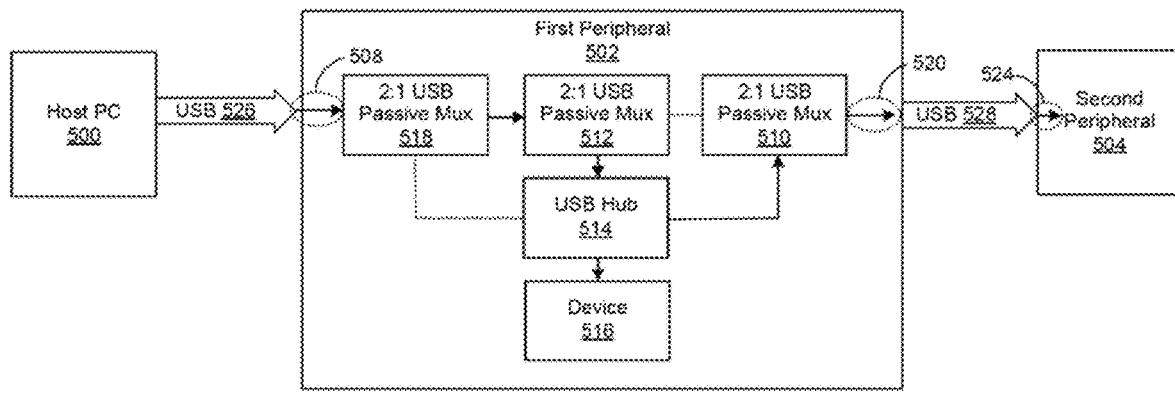
FIG. 5B illustrates a USB hub communication using 2:1 USB passive multiplexors of a peripheral device with a host and another peripheral device with input and output going from left to right of the peripheral device implemented in the present invention.

FIG. 5B shows USB hub communication using 2:1 USB passive multiplexors of peripheral device 502 with host PC 500 and peripheral device 504 with input and output going from left to right of the peripheral device 502.

USB connection 526 is provided from host PC 500 to the first peripheral 502. Directional input 508 is received from the host PC 500. In this implementation, the 2:1 USB passive mux 518 receives the input 508 and automatic switching is performed to receive the directional input 508. In other words, communication is from right to left as shown in FIG. 5B. Realizing which side (left/right) the peripheral device 502 is to the host 500, peripheral behavior can change depending on location of the peripheral device 502 to the host 500.

The 2:1 USB passive mux 518 passes communication to 2:1 USB passive mux 512. Communication continues to USB hub 514. As described, the USB Hub 514 controls communication flow in the first peripheral device 502, and communication is forwarded to device 516.

The USB hub 514 further directs communication to 2:1 USB passive mux 510. Output 520 is provided on USB connection 528 from the first peripheral device 502 to the second peripheral device 504. Input 524 is received by the second peripheral device 504. As described above, realizing which side (left/right) peripheral devices are to the host 500, peripheral behavior can change depending on location of the peripheral devices to the host 500.

In various embodiments, connections between the host PC 500, peripheral device 502, and peripheral device 504 provide for electrical connections, such as power, ground, high, low, normally closed (NC), high, low, etc. Such electrical connections are controlled from the host PC 500, such that power/electrical management is provided and maintained by the host PC 500 with connected peripheral devices (e.g., peripheral devices 502 and 504, peripheral devices 202). In certain embodiments, a pin can be used for management, such as I2C protocol which can be used for peripheral device. Implementations provide for the pogo pins described in FIGS. 4A, 4B, and 4C to provide for electrical connections and I2C protocol management.

Figure 6A:
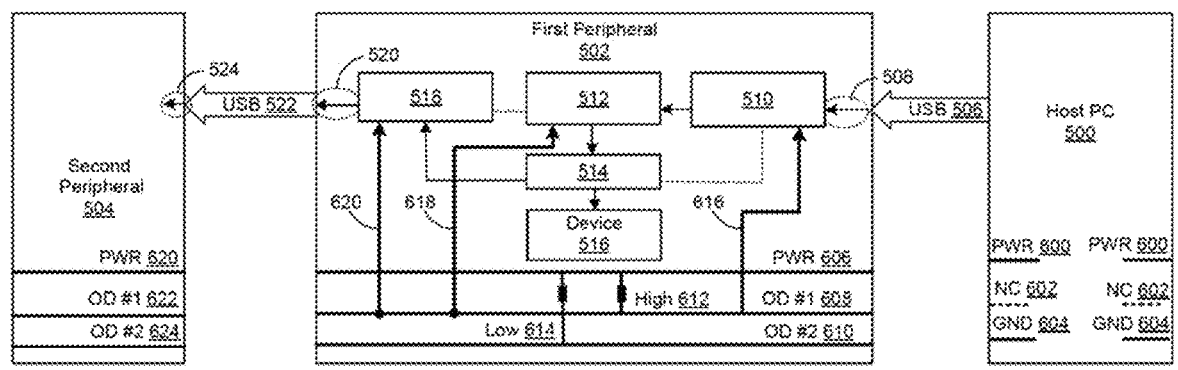
FIG. 6A illustrates a USB hub communication using 2:1 USB passive multiplexors of a peripheral device with a host and another peripheral device with input and output going from right to left of the peripheral device implementing power management by the host implemented in the present invention.

FIG. 6A shows USB hub communication using 2:1 USB passive multiplexors of peripheral device 502 with host PC 500 and peripheral device 504 with input and output going from right to left of the peripheral device 502, and implementing power management by the host 500. In various implementations, the host PC 500 reads identification or ID and power requirements of the peripheral device 502. Reading ID and power requirements can be performed for all potentially connected peripheral devices.

Implementations provide for host 500 to include a power line 600, a "no connect" or NC line 602, and a ground line 604. Through connections, such as USB connection 506 (e.g., power pins), power is provided to the peripheral device 502.

Implementations provide for peripheral device 502 can be implemented to include a power line 606, an orientation detect (OD) #1 line 608, and an orientation detect (OD) #2 line 610.

The power line 606 provides a high 612 signal and a low 614 signal. The high 612 signal indicates a direction (e.g., right to left to left to right) and the low signal indicates the other direction (e.g., left to right or right to left). Communication 616 is provided to 2:1 USB passive mux 510; communication 618 is provided to 2:1 USB passive mux 512; and communication 620 is provided to 2:1 USB passive mux. In the example shown in FIG. 6A, a high signal 612 indicates orientation from left to right. When muxes 510, 512 and 518 receive a high signal 612, direction from left to right is chosen.

Implementations provide for the second peripheral 504 to also include a power line 620, an orientation direction (OD) #1 line 622, and an orientation direction (OD) #2 line 624. The second peripheral 504 is configured to received power management as the first peripheral 502.

Figure 6B:
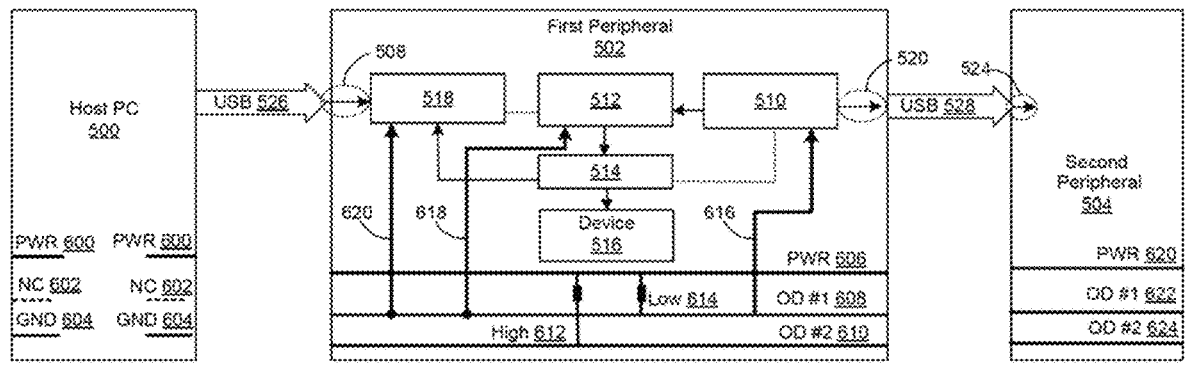
FIG. 6B illustrates a USB hub communication using 2:1 USB passive multiplexors of a peripheral device with a host and another peripheral device with input and output going from left to right of the peripheral device implementing power management by the host implemented in the present invention.

FIG. 6B shows USB hub communication using 2:1 USB passive multiplexors of peripheral device 502 with host PC 500 and peripheral device 504 with input and output going from left to right of the peripheral device 502, and implementing power management by the host 500.

In this implementation, when a low signal 614 is provided to muxes 510, 512 and 518, indicating a direction from right to left.

Figure 7A:
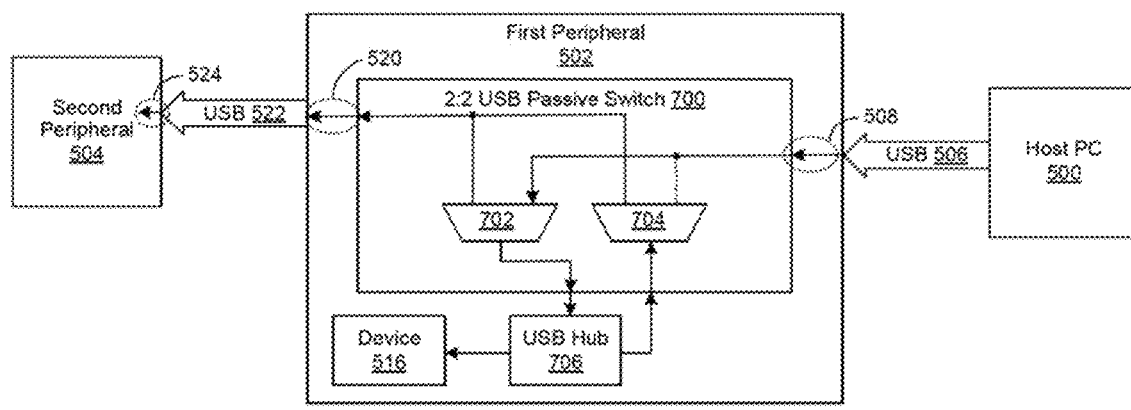
FIG. 7A illustrates a USB hub communication using 2:2 USB switch of a peripheral device with a host and another peripheral device with input and output going from right to left of the peripheral device implemented in the present invention.

FIG. 7A illustrates USB hub communication using 2:2 USB switch of peripheral device 502 with host PC 500 and peripheral device 504 with input and output going from right to left of the peripheral device 502. Implementations provide for different switching as described in FIGS. 5A and 5B. For example, a 2 input 2 output (2:2) USB passive switch 700 can be implemented, replacing the 2:1 USB passive muxes 510, 512, and 518. In such implementations, 2:2 USB passive switch 700 includes a mux 702 and mux 704.

In FIG. 7A, the mux 702 senses and receives the input 508 and communicates the input to USB hub 706, and communication flow from right to left is established. Realizing which side (left/right) the peripheral device 502 is to the host 500, peripheral behavior can change depending on location of the peripheral device 502 to the host 500.

The USB hub 706 controls communication flow in the first peripheral device 502. In particular, communication is forwarded to device 516. The USB hub 514 further directs communication to mux 704. The mux 704 communicates output 520 through USB connection 522 from the first peripheral device 502 to the second peripheral device 504. As described above, realizing which side (left/right) peripheral devices are to the host 500, peripheral behavior can change depending on location of the peripheral devices to the host 500.

Figure 7B:
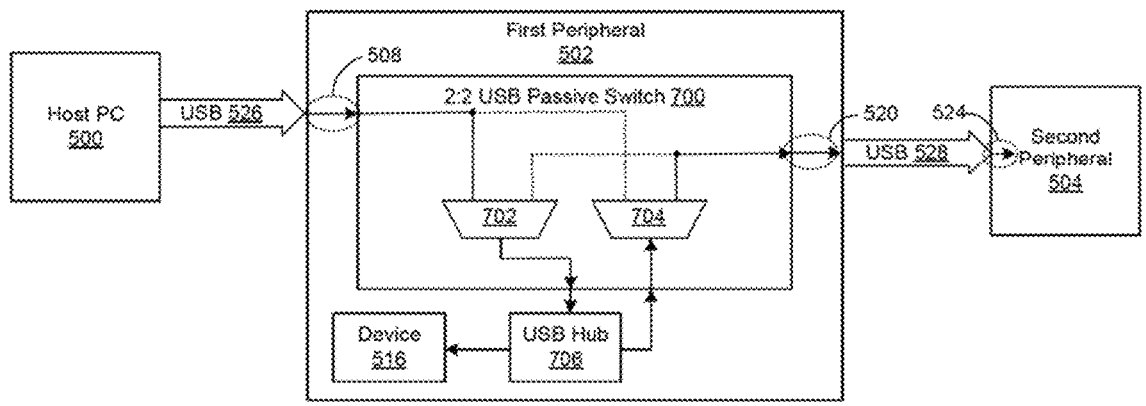
FIG. 7B illustrates a USB hub communication using 2:2 USB switch of a peripheral device with a host and another peripheral device with input and output going from left to right of the peripheral device implemented in the present invention.

FIG. 7B illustrates USB hub communication using the 2:2 USB switch 700 of peripheral device 502 with host PC 500 and peripheral device 504 with input and output going from left to right of the peripheral device 502. In this implementation, as in FIG. 7A, the 2:2 USB passive switch 700 is used. Similar to the implementation, described in FIG. 7A, the mux 702 senses and receives the senses and receives the input 508 and communicates the input to USB hub 706.

In this implementations, communication flow is established from left to right. Realizing which side (left/right) the peripheral device 502 is to the host 500, peripheral behavior can change depending on location of the peripheral device 502 to the host 500.

The USB hub 706 controls communication flow, and directs the mux 704 to send communication via a different path from what is shown in FIG. 6A to output 520 which communicated through USB connection 528 from the first peripheral device 502 to the second peripheral device 504. Input 524 is received by the second peripheral device 504. As described above, realizing which side (left/right) peripheral devices are to the host 500, peripheral behavior can change depending on location of the peripheral devices to the host 500.

Figure 8:
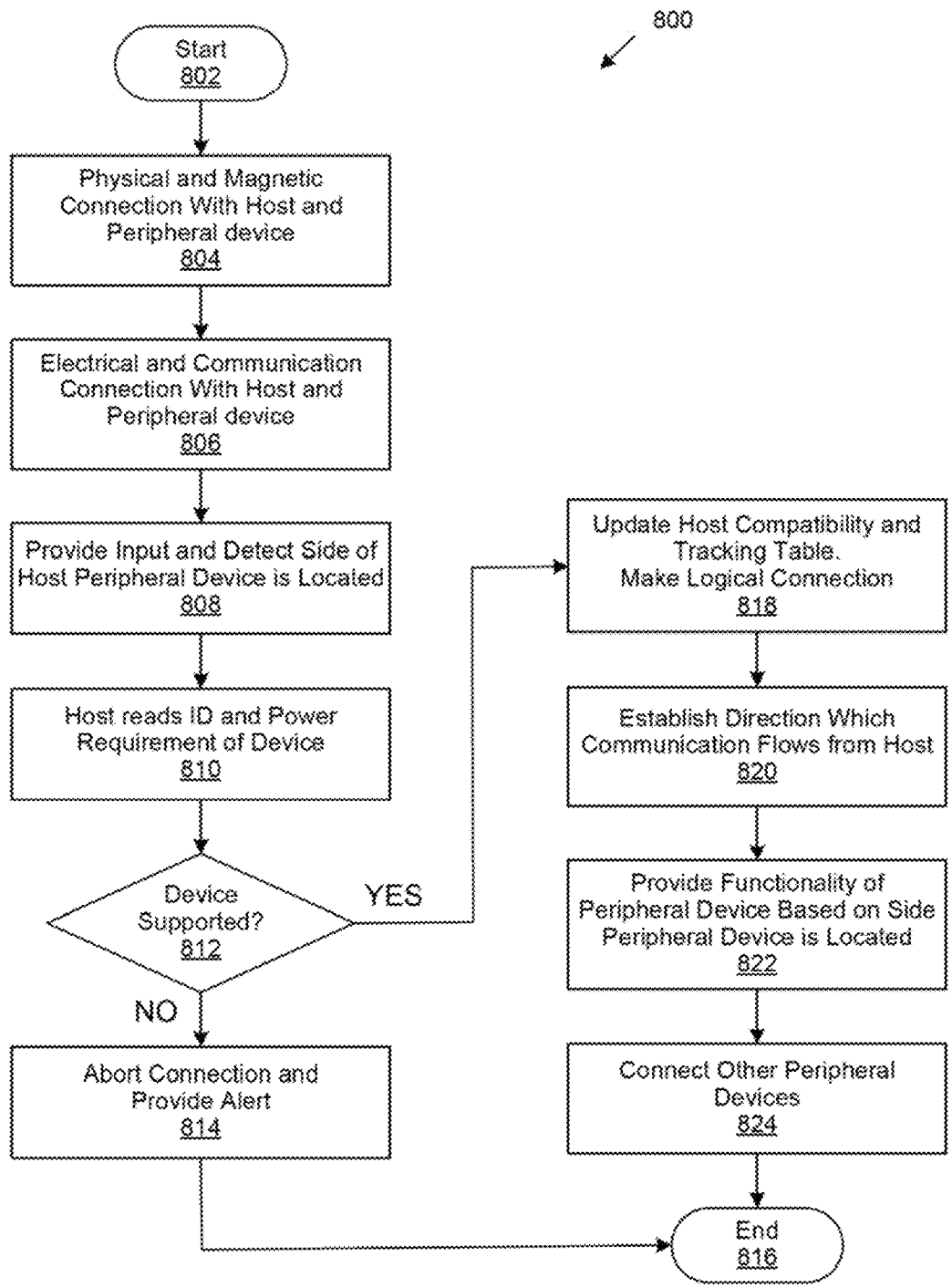
FIG. 8 is a generalized flowchart for connecting peripheral devices to a host as implemented in the present invention.

FIG. 8 is a generalized flowchart for connecting peripheral devices to a host as implemented in the present invention. The order in which the method is described is not intended to be construed as a limitation, and any number of the described method blocks may be combined in any order to implement the method, or alternate method.

At step 802, the process 800 starts. At step 804, physical and magnetic connections are performed with the host and a peripheral device, as describe herein. At step 806, electrical and communication connections are performed with the host and peripheral device, as described herein. Implementations provide for power management of the host to peripheral devices, including providing power to the peripheral devices.

At step 808, the host provides an input and detection is performed by the peripheral device as to which side of the host the peripheral device is located, as described herein.

At step 810, the host reads the ID and power requirements of the peripheral device. If the device is not supported, following the NO branch of step 812, then at step 814, connection is aborted and an alert is provided, such as flagging an error message. At step 816, the process 800 ends.

If the device is supported, following the YES branch of step 814, then at step 818, the compatibility tracking table 120 of the host is updated and a logical connection is performed with the device.

At step 820, direction of communication flow from the host to the peripheral device is established, as described herein. At step 822, functionality is provided of the peripheral device based on the location or side in which the peripheral device is to the host, as described herein.

At step 824, other peripheral devices can be connected to the host, such as on another side of the host, or connected to the peripheral device, as described herein. At step 816, the process 800 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. An information handling system configured to connect and communicate with one or more peripheral devices, comprising:
    physical USB connections to connect with the one or more peripheral devices, wherein different USB connections are provided when there are more than one peripheral devices;
    electrical and communication connections implemented on the USB connections to connect with the one or more peripheral devices;
    providing power and power management through the electrical connection;
    providing an input through the communication connection to the one or more peripheral devices, wherein the input is used by the one or more peripheral devices to establish communication flow between the information handling system and the one or more peripheral devices; and
    using the input at the peripheral device to determine functionality of the one or more peripheral devices in relation to the location of the information handling system.

2. The information handling system of claim 1, wherein the peripheral devices include one or more of 10-key pad, music mixer, video editor, photo editor, gaming keypad, TV remote, point of sale device, fingerprint reader, and programmable multi-function device.

3. The information handling system of claim 1, wherein physical connections include tab and slot connections and magnetic connections.

4. The information handling system of claim 1, wherein the electrical connection comprises pogo pin connections.

5. The information handling system of claim 1 further comprising reading by the information handling system an identifier and power requirements of a peripheral device to determine if the electrical connection can be supported.

6. The information handling system of claim 1, wherein a USB hub of a peripheral device controls communication flow of the peripheral device.

7. A peripheral device configured to connect and communicate with a host and other peripheral devices, comprising:
    physical USB connections to connect with the host and the other peripheral devices, wherein different USB connections are provided when there are more than one peripheral devices;
    electrical and communication connections implemented on the USB connections to connect with the other peripheral devices;
    receiving by the host and other peripheral devices, power and power management data through the electrical connection;
    receiving by the host an input through the communication connection, wherein the input is used to establish communication flow between the host and the other peripheral devices; and
    using by the host the input to determine functionality of the other peripheral devices in relation to the location of the host.

8. The peripheral device of claim 7, wherein the peripheral device is one of 10-key pad, music mixer, video editor, photo editor, gaming keypad, TV remote, point of sale device, fingerprint reader, or programmable multi-function device.

9. The peripheral device of claim 7, wherein physical connections include tab and slot connections and magnetic connections.

10. The peripheral device of claim 7, wherein the electrical connection comprises pogo pin connections.

11. The peripheral device of claim 7, further comprising reading an identifier and power requirements of the peripheral device by the host to determine if the electrical connection can be supported.

12. The peripheral device of claim 7, wherein a USB hub of the peripheral device controls communication flow of the peripheral device.

13. A method of connecting a host to one or more peripheral devices comprising:
    providing physical and magnetic connections between the host and the one or more peripheral devices, wherein different connections are provided when there are more than one peripheral devices;
    providing electrical and communication connections between the host and the one or more peripheral devices;
    sending an input from the host to the one or more peripheral devices; and
    establishing communication flow between the host and the one or more peripheral devices based on the input; and
    determining functionality of the one or more peripheral devices based on the input and location of the one or more peripheral devices in relation to the host.

14. The method of claim 13, wherein the electrical connections provide for power and power management of the one or more peripheral devices by the host.

15. The method of claim 13 further comprising connecting the one or more peripheral devices with one another.

* * * * *